Patented Aug. 20, 1929.

1,725,590

UNITED STATES PATENT OFFICE.

ARTHUR LÜTTRINGHAUS AND HUGO WOLFF OF MANNHEIM, GERMANY, ASSIGNORS, BY MESNE ASSIGNMENTS, TO GENERAL ANILINE WORKS, INC., OF NEW YORK, N. Y., A CORPORATION OF DELAWARE.

PRODUCTION OF ISODIBENZANTHRONES.

No Drawing. Application filed October 16, 1925, Serial No. 62,933, and in Germany February 28, 1925.

Our present invention relates to an improvement in the manufacture of isodibenzanthrones and in the production of new derivatives of this class of vat dyestuffs. According to the known method, isodibenzanthrones are produced by condensing halogenated benzanthrones, which are Bzl-halogen-benzanthrones, with the aid of a caustic alkali melt or of alkali metal alcoholate.

We have now found that Bzl-halogen-benzanthrones which of course must contain a free 2-position, can be converted into isodibenzanthrones with excellent yield by employing metal arylides as condensing agents.

The following examples will serve to further illustrate the nature of our invention which however is not restricted to these examples. The parts are by weight.

*Example 1.*

8 parts of metallic sodium are dissolved in 400 parts of anhydrous aniline to form a solution of sodium anilide. The solution is cooled to 15 degrees centigrade, and 40 parts of chlor-benzanthrone (as obtained in accordance with Example 5 of the German Patent 193,959, substantially consisting of Bzl-chlor-benzanthrone) are then added all at once, when the temperature of the mass will rise to about 25 degrees centigrade and its red brown color turn pure crimson red. Stirring is continued at 25 degrees centigrade for 1 or 2 more hours until the formation of dyestuff is complete and the mass is then worked up, for example by pouring it into dilute acid or by first filtrating it at about 50 degrees centigrade and treating the residue with steam or dilute hydrochloric acid. The dyestuff is filtered off, washed and dried. It can be purified and made into a paste by reprecipitating it from warm concentrated sulfuric acid and dyes the vegetable fibre bright reddish violet shades. The dyestuff consists substantially of isodibenzanthrone corresponding to the formula—

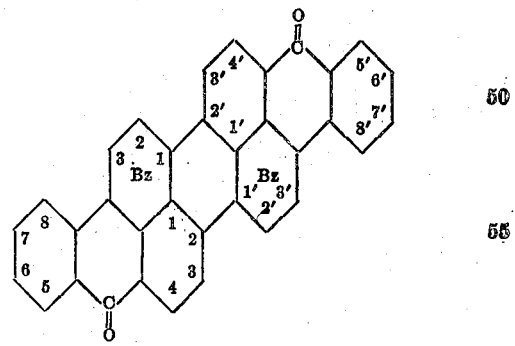

The temperature of the reaction mass can be varied within rather wide ranges, and with boiling aniline the reaction goes on in a similar way as at ordinary temperature. Instead of sodium, potassium and other metals can be used and aniline may be replaced by mono-methyl-aniline or other suitable solvents.

*Example 2.*

17 parts of calcium metal are boiled with 400 parts of dry aniline and 0.04 part of nickel oxid in a current of nitrogen until the calcium has practically disappeared. 40 parts of Bzl-chlor-benzanthrone are then added and the mass, which at once assumes a red violet color, is boiled until the formation of dyestuff is completed. The mass may then be worked up as described in the foregoing examples. The dyestuff which is obtained in a good yield is a dark powder which dissolves in concentrated sulfuric acid with a green coloration as is characteristic for isodibenzanthrone.

*Example 3.*

10 parts of magnesium chips are boiled with 400 parts of aniline and 0.5 part of sodium amid until practically all of the magnesium is converted into magnesium anilide. After reducing the temperature to 150 degrees centigrade, 40 parts of Bzl-chlor-benzanthrone are introduced and the mass is stirred at from 150 degrees to 155 degrees centigrade for about two hours whereupon it is worked up in the described manner. The resulting dyestuff is isodibenzanthrone corresponding to the formula given above in Example 1.

Instead of Bzl-chlor-benzanthrone, Bzl-brom-benzanthrone or derivatives of Bzl-halogen-benzanthrones with free 2-positions may also be employed.

*Example 4.*

10 parts of 6.Bzl-dichlor-benzanthrone (which may be obtained by acting on 6-chlor-benzanthrone with sulfuryl chlorid and forms yellow needles melting at 262 degrees to 264 degrees centigrade) are introduced into a mixture of 15 parts of sodium anilide and 200 parts of dry aniline, heated to a temperature of 100 degrees centigrade, while passing a current of nitrogen through the mass. In the course of the introduction, the temperature rises to 116 degrees to 118 degrees centigrade which temperature is maintained for about an hour. The violet reaction mass is worked up in the manner described in the foregoing examples. The dyestuff which is crude 6.6'-dichlor-isodibenzanthrone corresponding to the formula—

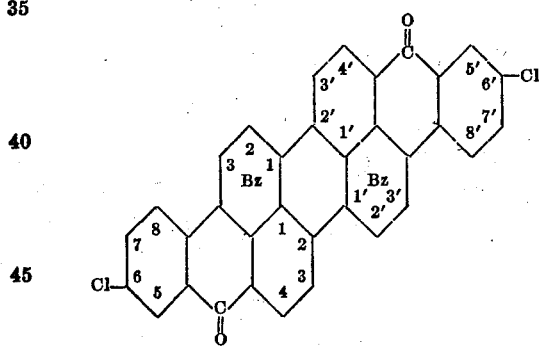

can be purified by crystallization from concentrated sulfuric acid. It forms a dark violet powder difficultly soluble in concentrated sulfuric acid to a green solution. Its blue vat produces on cotton violet blue shades which excel over isodibenzanthrone and its known halogen derivatives by the fact that after boiling with soap, washing and drying at room temperature they practically do not assume a redder tinge when wetted.

With 8.Bzl-dichlor-benzanthrone instead of 6.Bzl-dichlor-benzanthrone, 8.8'-dichlor-isodibenzanthrone corresponding to the formula—

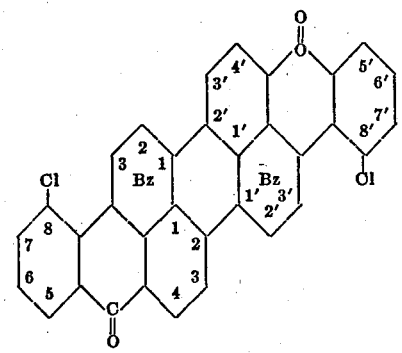

is obtained which dyes cotton from a blue vat reddish violet shades. 8.Bzl-dichlorbenzanthrone, melting at 218 degrees to 220 degrees centigrade, can be produced by treating the 8-chlor-benzanthrone (obtainable from 1-chlor-anthraquinone, glycerol and sulfuric acid in the presence of aniline sulfate and fractional crystallization, melting point 174 degrees centigrade) with a chlorinating agent.

We claim:

1. The process of manufacturing isodibenzanthrone vat coloring matters which consists in acting on a Bzl-halogen-benzanthrone containing a free 2-position with a metal compound of an aromatic amine.

2. The process of manufacturing isodibenzanthrone vat coloring matters which consists in acting on a dichlor-benzanthrone containing one chlorin atom in Bzl-position and a free 2-position with a metal compound of an aromatic amine.

3. As a new article of manufacture, 6.6'-dichlorisodibenzanthrone.

In testimony whereof we have hereunto set our hands.

ARTHUR LÜTTRINGHAUS.
HUGO WOLFF.